United States Patent [19]

Wilkerson

[11] 4,020,287
[45] Apr. 26, 1977

[54] TELEPHONIC TROUBLESHOOTING CIRCUIT FOR ELECTRIC MOTOR DRIVES

[75] Inventor: Alan W. Wilkerson, Thiensville, Wis.

[73] Assignee: Allen-Bradley Company, Milwaukee, Wis.

[22] Filed: Mar. 3, 1975

[21] Appl. No.: 554,506

[52] U.S. Cl. .............................. 179/2 A; 179/175; 340/207 R

[51] Int. Cl.² ................................... H04M 11/00

[58] Field of Search ........ 179/2 A, 2 C, 1 C, 2 DP, 179/175; 340/207 R

[56] References Cited

UNITED STATES PATENTS

| | | | |
|---|---|---|---|
| 2,810,017 | 10/1957 | Tyszkiewicz | 179/2 A |
| 3,217,254 | 11/1965 | Hughes et al. | 179/1 C |
| 3,266,018 | 8/1966 | Higgins | 179/2 A |
| 3,339,193 | 8/1967 | Epstein | 340/207 R |
| 3,376,389 | 4/1968 | Fair | 179/2 A |
| 3,400,378 | 9/1968 | Smith et al. | 179/2 A |
| 3,405,234 | 10/1968 | West | 179/2 A |
| 3,597,546 | 8/1971 | Zehr | 179/1 C |
| 3,824,857 | 7/1974 | Smith | 340/207 R |

Primary Examiner—Douglas W. Olms
Attorney, Agent, or Firm—Andrus, Sceales, Starke & Sawall

[57] ABSTRACT

Electrical phenomena from electric motor drive circuitry is transmitted through telephone couplers, telephones, and telephone lines to provide signal data to a service technician remote from the circuitry for ascertaining the operative condition of the motor drive circuitry.

6 Claims, 2 Drawing Figures

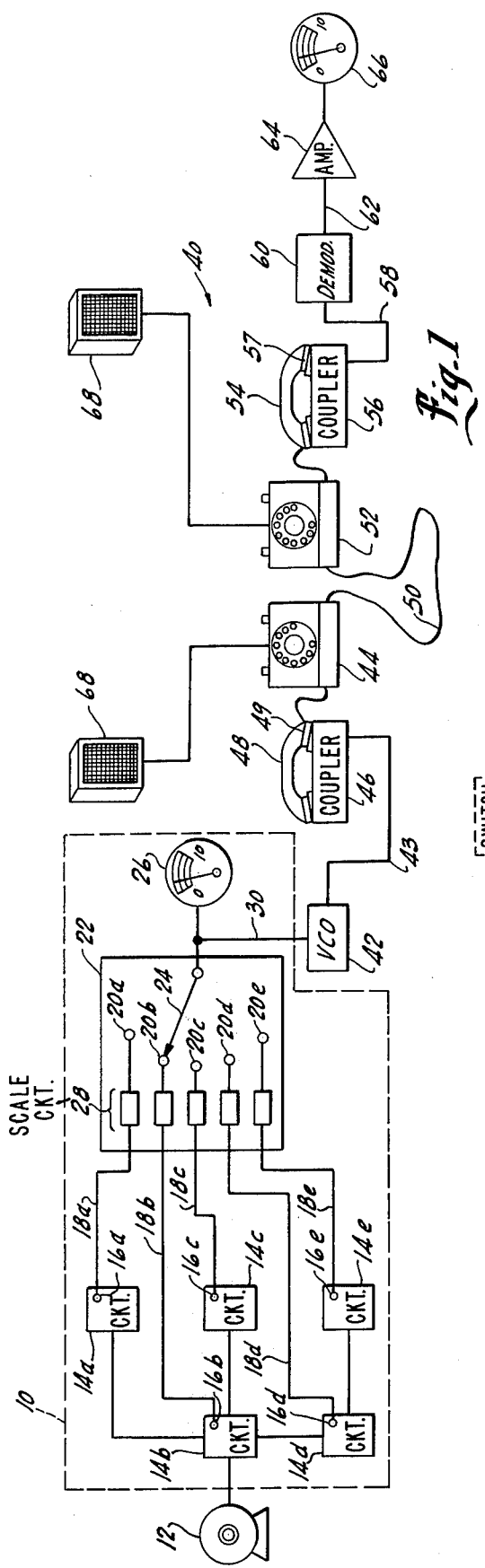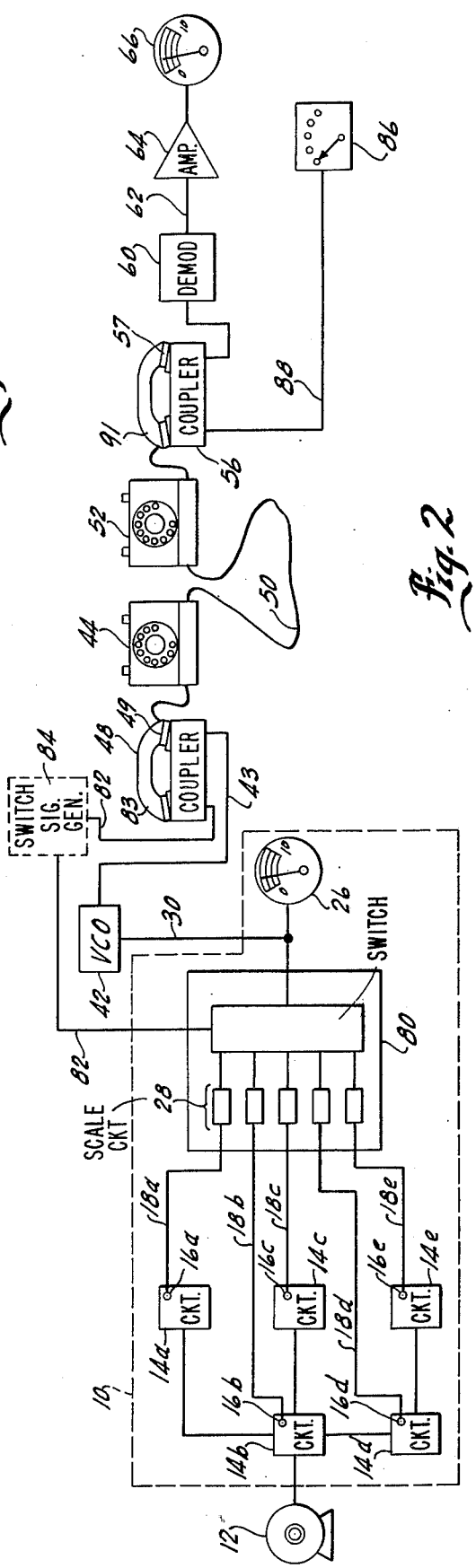

TELEPHONIC TROUBLESHOOTING CIRCUIT FOR ELECTRIC MOTOR DRIVES

BACKGROUND OF THE INVENTION

1. Field of the Invention

The present invention relates to a technique for remotely ascertaining electrical conditions in drive circuitry.

2. Description of the Prior Art

Electrical circuitry, such as electrical drive circuitry for controlling the speed, torque and/or power output of one or more electric motors, is commonly supplied with a plurality of test points throughout the circuitry. A test instrument may be connected to the test points to ascertain appropriate electrical phenomena in the circuitry and its operative condition. In improved types of drives, and test points are wired to a multiple position switch, which in turn is connected to a test instrument, such as a meter. By moving the switch to the various positions, the test points in the circuitry are connected to the meter. Scaling circuitry may be interposed between the test points and the meter to accommodate a variety of electrical phenomena on a single meter and the meter may be provided with a plurality of scales.

Instruction manuals are provided by the manufacturer of the electrical circuitry to the purchaser-operator. These manuals detail test and trouble shooting procedures including the sequence of the test points or switch positions necessary for the diagnosis and analysis of the probable faults in the circuitry.

Such procedures are not altogether satisfactory. In the event the operator cannot diagnose the cause of the faulty condition, he ordinarily telephones the technical service personnel of the manufacturer explaining the symptoms and manifestations of the fault and the associated electrical phenomena. Under such conditions, the service technician is frequently unable to assist the operator of the circuitry. The operator may unrealizingly not be following the correct test procedure and may be reporting incorrect data. Or, the operator may be following the correct test procedure but misinterpreting the data. Or, the operator may simply not be able to describe the situation over the telephone sufficiently to enable the service technician to ascertain the fault.

The result is often that the service technician is required to make a service call to correct what is, in reality, a minor problem. This is expensive for the operator and time consuming for the manufacturer, particularly where the equipment is found in a remote location.

SUMMARY OF THE PRESENT INVENTION

There has therefore risen a need for a means by which a service technician in the manufacturer's plant can directly ascertain electrical phenomena in electrical equipment located in the operator's plant. It is the object of the present invention to provide such a means.

The present invention contemplates a technique by which electrical phenomena in the operator's electrical circuitry may be transmitted over telephone lines to the service technician in the manufacturer's plant. The service technician can thus view the electrical phenomena more directly to diagnose the fault and direct remedial action.

BRIEF DESCRIPTION OF THE DRAWING

FIG. 1 is a schematic diagram of the telephonic electrical drive trouble shooting circuit of the present invention.

FIG. 2 is a schematic diagram showing another embodiment of the telephonic trouble shooting circuitry of the present invention.

DESCRIPTION OF THE PREFERRED EMBODIMENT

In FIG. 1, the improved troubleshooting circuitry of the present invention is shown in conjunction with electrical circuitry 10. Electrical circuitry 10 may be a drive circuit for controlling the operative condition of motor 12. Circuit 10 includes a plurality of individual circuits, five of which are shown in FIG. 1 by the numerals 14a through 14e. These circuitries perform various functions within electrical circuitry 10. Each of circuitries 14a through 14e may contain one or more test points 16a through 16e. Improved types of drives, leads 18a through 18e connect the test points to contacts 20a through 20e of switch 22. Switch arm 24 selectively engages contacts 20a through 20e for connecting the test points to meter 26. Scaling circuitry 28 may be interposed between test points 14 and contacts 20 so as to provide a deflection to meter 26 appropriate to the scale or scales of meter 26.

In electrical circuitry 10 of FIG. 1, one end of conductor 30 is connected intermediate switch 22 and meter 26 while the other end is connected to telephonic transmission circuitry 40. While many telephonic transmission techniques may be employed in the present invention, such as amplitude modulation, pulse width modulation, etc., frequency modulation will be used to describe the construction and operation of telephonic transmission circuitry 40. Telephonic transmission circuitry 40 includes a source of a suitable carrier signal, such as voltage controlled oscillator 42 which provides a base frequency signal suitable for transmission over telephone lines. Conductor 30 is connected to voltage controlled oscillator 42 to alter the base frequency of the output signal of oscillator 42 in conductor 43 in accordance with the output of switch 22 and the magnitude of the signal in conductor 30.

The output of voltage controlled oscillator 42 may be provided to an accoustical coupler for coupling the output of voltage controlled oscillator 42 to telephone 44. Accoustical coupler 46 may include a cradle 46 for handset 48 of telephone 44 and converts the electrical signals from oscillator 42 into audio signals which are provided to microphone 49 of handset 48. Telephone 44 which is of conventional construction is mounted in or near electrical circuitry 10. Telephone 44 is connected to telephone line 50 for providing the signals over the line.

The other end of telephone line 50 is connected to telephone 52, the hand set of 54 of which is connected to a second accoustical coupler 56 suitable for receiving the audio signal in the earphone 57 of handset 54 and providing a corresponding electrical signal in conductor 58.

Conductor 58 is connected to demodulator 60 which removes the carrier signal and provides a signal in conductor 62 corresponding to the signal in conductor 30. Amplifier 64 may be used to restore any loss of signal level accompanying the transmission of the signals. The output of amplifier 64 is provided to meter 66 which may be similar to meter 26 in circuitry 10.

In operation, in the event of a fault or malfunction in electrical circuitry 10, the user or operator of the circuitry dials the manufacturer or other service agency on telephone 44. The manufacturer's service technician instructs the user to place handset 48 in coupler 46. The service technician then places his handset 54 in coupler 56. Extension speakers 68 connected to telephones 44 and 52 may thereafter be used for communication between the operator of the electrical circuitry and the service technician.

The service technician then instructs the operator to operate switch 24 to connect the appropriate test point to conductor 30. An FM signal, modulated in accordance with the magnitude of the signal in conductor 30 is provided to accoustical coupler 46 and through microphone 49 of handset 48 and telephone 44 to telephone line 50.

In the manufacturer's plant, the signal in telephone line 50 is provided through telephone 52 to the earphone of handset 54 and from accoustical coupler 56 to conductor 58. The signal in conductor 58 is demodulated by demodulator 60 and provided through amplifier 64 to meter 66 to provide an indication on meter 66 of the magnitude of the signal in conductor 30. By viewing the deflection of meter 66, the service technician can ascertain the magnitude of the electrical signal at the selected test point in electrical circuitry 10.

If one reading is insufficient to diagnose the malfunction, the service technician instructs the operator to operate switch 22 to provide readings on meter 66 from other test points 16a through 16e in electrical circuitry 10.

When the malfunction has been diagnosed, the service technician instructs the operator in the appropriate remedial action, for example, the removal and replacement of a printed circuit board containing one or more of the circuitries of 14a through 14e. The operation of electrical circuitry 10 is then checked on meter 66 by the service technician to confirm the correctness of the diagnosis and remedial action, after which handsets 48 and 54 are replaced on telephone 44 and 52 to disconnect telephone line 50. The service procedure is then complete.

FIG. 2 shows a modification of the circuitry of FIG. 1. The circuitry avoids the situation in which the user of electrical circuitry 10 may not operate switch 22 correctly and thus provide incorrect data. The circuitry of FIG. 2 enables the service technician in the manufacturer's plant to operate the switch which connects the test points to telephonic transmission circuitry 40. Switch 22 of FIG. 1 is replaced with an electrically operated switch 80 which is responsive to the electrical signal in conductor 82. For example, switch 80 may be a pulse operated stepper switch which, responsive to pulses in conductor 82, moves switch 80 one switching position for each pulse. Or, switch 80 may be such as to connect the desired test point to conductor 30 responsive to the appropriate coded signal in conductor 82.

Conductor 82 is connected to the earphone 83 of handset 50. Circuitry 84 may be interposed in conductor 82 to provide signals appropriate for the operation of switch 80 from the signals received in the earphone of handset 48.

The service technician is provided with a signal generator 86 which provides signals in conductor 88 to the microphone 91 of handset 54.

The initial steps of the diagnostic procedure is the same with the circuitry of FIG. 2 as with the circuitry of FIG. 1. Once the handsets 54 and 48 are in accoustical couplers 56 and 46, the service technician operates signal generator 86 to provide signals in conductor 88 to the microphone 91 of handset 54. The signal is received, via telephone lines 50 in earphone 83 of handset 48 and is provided in conductor 82 to switch 80 to operate the switch to connect the appropriate test point to conductor 30. The signal from the test point is then provided to meter 66 by the operation described above. In the event one operation of switch 80 is insufficient to diagnose the malfunction of electrical circuitry 10, the service technician operates signal generator 86 to further operate switch 80 to provide the signals from additional test points to meter 66. When the malfunction has been diagnosed, the service technician instructs the user to correct the fault, as described above.

Various modes of carrying out the invention are contemplated as being within the scope of the following claims particularly pointing out and distinctly claiming the subject matter which is regarded as the invention.

I claim:

1. An electric motor drive, the operative condition of which may be remotely ascertained with conventional telephone connection means and lines, comprising:
   circuitry means for energizing the electric motor, said circuitry means having a plurality of test points providing operative condition responsive signals suitable for diagnosing the condition of the circuitry;
   switch means having an input coupled to said test points for obtaining said condition responsive signals and having an output providing a selected condition responsive signal;
   signal generating means coupled to the output of said switch means for generating audio tones indicative of the magnitude and polarity of said selected condition responsive signal and having a frequency suitable for transmission over conventional telephone lines;
   a first audio telephone coupler connected to said signal generating means and connectable to telephone connection means and lines;
   a second audio telephone coupler connectable to said telephone connection means and lines;
   converting means having an input connected to said second audio telephone coupler for receiving said transmission signal and having an output, said converting means converting the audio tone transmission signal to an analog electrical output signal corresponding to the selected condition responsive signal;
   indicator means coupled to the output of said converting means and operable by the output signal of said converting means for providing a remote indication of the selected condition responsive signal; and
   means operatively associated with said couplers for obtaining voice communication over said telephone connection means and lines.

2. The drive according to claim 1 wherein said signal generating means includes modulatable base audio frequency signal generating means, said switch means being coupled to said base frequency signal generating means for modulating said base frequency signal in accordance with said condition responsive signal, and wherein said converting means includes demodulation means for providing the analog electrical output signal.

3. The drive according to claim 1 wherein said indicator means comprises a meter.

4. The drive according to claim 3 wherein said meter includes a scale and said signal generating means includes scaling circuitry for providing condition responsive signals suitable for the scale of said meter.

5. The drive according to claim 3 wherein said meter includes a plurality of scales and said signal generating means includes scaling circuitry for providing condition responsive signals suitable for the scales of said meter.

6. An electric motor drive, the operative condition of which may be ascertained with conventional telephone connection means and lines, comprising:

circuitry means for energizing the electric motor, said circuitry means having a plurality of test points providing operative condition responsive signals suitable for diagnosing the condition of the circuitry;

switch means having an input coupled to said test points for obtaining said condition responsive signals and having an output providing a selected condition responsive signal;

signal generating means coupled to the output of said switch means for generating audio tones indicative of the magnitude and polarity of said selected condition responsive signal and having a frequency for transmission over conventional telephone lines;

a first audio telephone coupler connected to said signal generating means and connectable to telephone connection means and lines;

a second audio telephone coupler connectable to said telephone connection means and lines;

converting means having an input connected to said second audio telephone coupler for receiving said transmission signal and having an output, said converting means converting the audio tone transmission signal to an analog electrical output signal corresponding to the selected condition responsive signal; and indicator means coupled to the output of said converting means and operable by the output signal of said converting means for providing a remote indication of the selected condition responsive signal, said switch means being further defined as signal responsive, said drive further including a signal generator coupled to said second telephone coupler, and said drive including means connected to said first telephone coupler and to said switch means for operating said switch means responsive to signals from said signal generator.

* * * * *

UNITED STATES PATENT AND TRADEMARK OFFICE
CERTIFICATE OF CORRECTION

PATENT NO. : 4,020,287
DATED : April 26, 1977
INVENTOR(S) : Alan W. Wilkerson

It is certified that error appears in the above-identified patent and that said Letters Patent are hereby corrected as shown below:

Column 1, Line 18  Delete "and" and substitute therefor
---the---

Claim 6, Column 5, Line 15  Before "ascertained" insert
---remotely---

Claim 6, Column 6, Line 2  Before "for" insert
---suitable---

Signed and Sealed this

Sixth Day of September 1977

[SEAL]

Attest:

RUTH C. MASON
Attesting Officer

LUTRELLE F. PARKER
Acting Commissioner of Patents and Trademarks